United States Patent
Kaindl et al.

(10) Patent No.: US 11,869,479 B2
(45) Date of Patent: Jan. 9, 2024

(54) 1D ULTRASONIC CONVERTER UNIT

(71) Applicant: Pepperl + Fuchs SE, Mannheim (DE)

(72) Inventors: Thomas Kaindl, Dossenheim (DE); Regine Augenstein, Mannheim (DE); Mario Kupnik, Darmstadt (DE); Axel Jaeger, Ingolstadt (DE); Matthias Rutsch, Darmstadt (DE)

(73) Assignee: Pepperl + Fuchs SE, Mannheim (DE)

( * ) Notice: Subject to any disclaimer, the term of this patent is extended or adjusted under 35 U.S.C. 154(b) by 561 days.

(21) Appl. No.: 17/148,418

(22) Filed: Jan. 13, 2021

(65) Prior Publication Data

US 2021/0134261 A1 May 6, 2021

Related U.S. Application Data

(63) Continuation of application No. PCT/EP2019/000162, filed on May 23, 2019.

(30) Foreign Application Priority Data

Jul. 13, 2018 (DE) .................. 10 2018 005 540.0

(51) Int. Cl.
*G01S 15/02* (2006.01)
*G10K 11/34* (2006.01)
(Continued)

(52) U.S. Cl.
CPC .......... *G10K 11/346* (2013.01); *B06B 1/0622* (2013.01); *G01F 1/662* (2013.01)

(58) Field of Classification Search
CPC ............ G01S 15/00–12; G10K 11/346; B06B 1/0622; G01F 1/662
See application file for complete search history.

(56) References Cited

U.S. PATENT DOCUMENTS 6,310,831 B1   10/2001  Dilman
7,522,475 B2 *  4/2009  Kojima .................. G10K 11/22
                                                        367/188
(Continued)

FOREIGN PATENT DOCUMENTS

EP        0928640 A1    7/1999
EP       0 940 801 A2   9/1999
(Continued)

OTHER PUBLICATIONS

Konetzke et al., "Phased Array Transducer for Emitting 40-KHz Air-Coupled Ultrasound without Grating Lobes," IEEE Int'l Ultrasonic Symposium, pp. 1-4 (Oct. 21, 2015).
(Continued)

*Primary Examiner* — Nguyen Q. Ha
(74) *Attorney, Agent, or Firm* — Muncy, Geissler, Olds & Lowe, P.C.

(57) ABSTRACT

A 1D ultrasonic converter unit having at least three ultrasonic converters and a control unit for individually controlling each ultrasonic converter, wherein each ultrasonic converter has a housing, a piezoelectric body, and a sound decoupling layer for decoupling sound waves in a gaseous medium, is embedded in a common carrier structure, and emits and/or receives the same frequency between 20 kHz and 400 kHz. Each ultrasonic converter has one sound channel having an input opening associated with one sound decoupling layer, and an output opening. The output openings are arranged along a line, a distance between two adjacent output openings corresponds at most to the whole or half the wavelength of the sound frequency and is smaller than the distance of the input openings.

15 Claims, 3 Drawing Sheets

(51) Int. Cl.
*B06B 1/06* (2006.01)
*G01F 1/66* (2022.01)

(56) References Cited

U.S. PATENT DOCUMENTS

| | | | |
|---|---|---|---|
| 2001/0049962 A1 * | 12/2001 | Yanagida | G01N 29/46 73/628 |
| 2013/0283918 A1 | 10/2013 | Habermehl et al. | |
| 2014/0283611 A1 | 9/2014 | Habermehl et al. | |
| 2018/0132827 A1 | 5/2018 | Nakanishi et al. | |

FOREIGN PATENT DOCUMENTS

| | | | | |
|---|---|---|---|---|
| FR | 3022634 A1 * | 12/2015 | | G01N 29/043 |
| JP | 10224880 A * | 8/1998 | | G01N 29/07 |
| JP | 2002186617 A | 7/2002 | | |
| JP | 2018075286 A | 5/2018 | | |
| WO | WO 2008/135004 A1 | 11/2008 | | |

OTHER PUBLICATIONS

Takahashi et al., "Ultrasonic Phased Array Sensor for an Electric Travel Aids for Visually Impaired People," Proc. of SPIE, vol. 6794, pp. 1-7 (Dec. 3, 2007).
Jaeger et al., "Air-Coupled 40-KHz Ultrasonic 2D-Phased Array Based on a 3D-Printed Waveguide Structure," IEEE Intl Ultrasonic Symposium, pp. 1-4 (Sep. 6, 2017).
Murata Manufacturing, "Ultrasonic Sensor Application Manual Cat. No. S15E-5," at https://cdn-reichelt.de/documents/datenblatt/B400/ULTRASCHALL%20SENSOR.pdf, pp. 1-17, Jan. 2019.

* cited by examiner

1D ULTRASONIC CONVERTER UNIT

This nonprovisional application is a continuation of International Application No. PCT/EP2019/000162, which was filed on May 23, 2019 and which claims priority to German Patent Application No. 10 2018 005 540.0, which was filed in Germany on Jul. 13, 2018 and which are both herein incorporated by reference.

BACKGROUND OF THE INVENTION

Field of the Invention

The present invention relates to a 1D ultrasonic converter unit having at least three discrete and individually controllable ultrasonic converters for detecting objects, contours, or distances.

Description of the Background Art

Ultrasound or ultrasonic converters are used in a wide variety of measurement arrangements. Depending on the application, the ultrasound is decoupled in a liquid or gaseous medium.

An ultrasonic converter array for use in gaseous media is known from WO 2008/135 004 A1. The array has a layer structure made of a layer of an electret between two electrode structures, wherein the one electrode structure comprises a plurality of independently addressable electrode elements, by means of which local thickness vibrations of the electret layer are generated.

A 1.5D array of ultrasonic converters with an improved near-surface resolution is known from US 2013/0283918 A1. Phase-controlled ultrasonic converter arrays and adaptive or compensating control methods are described in US 2014/0283611 A1 and U.S. Pat. No. 6,310,831 B1.

Further ultrasonic converters are known from EP 0 940 801 A2 and from "Phased array transducer for emitting 40 kHz air-coupled ultrasound without grating lobes," Eric Konetzke et al., IEEE International Ultrasonic Symposium, 2015, pp. 1-4 and from "Air-coupled 40-kHz ultrasonic 2D-phased array based on a 3D-printed waveguide structure," Jäger et al., IEEE International Ultrasonic Symposium, 2017, pp. 1-4, and from Takahashi et al., "Ultrasonic phased array sensor for electrical travel aids for visually impaired people," Proceedings of SPIE (The International Society for Optical Engineering SPIE), Vertical-cavity Surface-emitting Lasers XIII, Vol. 6794, Dec. 3, 2007, Page 67943V, ISSN: 0277-786X", and from "Murata Manufacturing Co.: Ultrasonic Sensor Application Manual Cat. No. S15E-5, Jan. 1, 2009, URL:https://cdn-reichelt.de/documents/datenblatt/B400/ultraschall%20sensor.pdf, page 3."

For use in an industrial environment, the ultrasonic converters used must be able to guarantee a temperature stability of the measurement from −40° C. to in part over 100° C. and an electromagnetic compatibility with other technical devices. In addition, the ultrasonic converters must be robust against harsh environmental influences, such as, e.g., dust, moisture, aggressive chemicals, as well as against mechanical impacts or against mechanical scratching.

To achieve high detection ranges, piezoelectric ceramics, such as, e.g., lead zirconate titanate (PZT), are used, which have high coupling factors compared with other piezoelectric materials such as quartz, electrets, or PVFD. The coupling factor in this regard is a measure of the conversion efficiency between mechanically and electrically stored energy. For PZT, depending on the excitation direction, these are, for example, in the range from 0.3 to approximately 0.75.

Depending on the direction of polarization of the piezoelectric material, resonant mechanical vibrations can be generated with the aid of alternating voltages in the piezoelectric body; these are referred to as planar, thickness, or shear vibrations, depending on their geometric propagation. Typical dimensions of the piezoelectric body, which are necessary for a resonant vibration at a given frequency, can be estimated from the material-specific frequency constants for the different vibration forms.

The frequency constants for PZT are typically between 1300 kHz·mm to 2600 kHz·mm, depending on the type of vibration.

A thin disk made of PZT suitable for the sensor technology accordingly has a diameter of approximately 4 mm to 100 mm for excitation frequencies of 20 kHz to 500 kHz in the planar mode. Due to the capacitive properties of such a thin disk, low excitation voltages can be easily realized with an appropriate polarization.

Greater piezo disk thicknesses are not worthwhile. On the one hand, with increasing thickness of the piezoelectric material, higher voltages, rapidly in the kV range as well, must be applied for the same frequency range, which means a greater safety effort. On the other hand, the rigidity of the piezoelectric body also changes with its thickness, which has direct effects on the reception of sound waves.

When a number of ultrasonic converters are used in a phase-controlled, at least one-dimensional array (phased array), it must be noted further that the distances between neighboring ultrasonic converters must not be greater than the wavelength of the ultrasonic wave or preferably not greater than half the wavelength.

The overall size of the individual converters or the frequency ranges possible with a certain design/size of the ultrasonic converters are limited by the distance condition.

For example, a maximum distance between adjacent converters in the order of magnitude of approximately 8.5 mm to approximately 0.3 mm results for a frequency range between 20 kHz and 500 kHz and decoupling in air.

The previously described converter with a thin disk made of PZT, suitable for sensor technology, however, has a diameter that is more than 10 times larger on average due to the piezo disk diameter.

SUMMARY OF THE INVENTION

It is therefore an object of the invention to provide a device that advances the state of the art.

According to the subject of the invention, a 1D ultrasonic converter unit is provided.

The exemplary 1D ultrasonic converter unit comprises at least three ultrasonic converters for detecting objects, contours, or distances, for example, at a distance of 0.5 m and more, and a control unit.

The control unit is designed to control each ultrasonic converter individually.

The ultrasonic converters are embedded in a common support structure, wherein each ultrasonic converter has a housing, a piezoelectric body disposed in the housing, and a sound decoupling layer, arranged at an open end of the housing, e.g., a correspondingly arranged surface of the piezoelectric body, for decoupling sound waves in a gaseous medium.

Each ultrasonic converter is designed to emit and/or to receive the same frequency, wherein the frequency is in a range from 20 kHz to 400 kHz.

In each case, two ultrasonic converters, directly adjacent to one another, have a distance from the center of the sound decoupling layer to the center of the sound decoupling layer of at most 10 cm or at most 5 cm or at most 2 cm.

The 1D ultrasonic converter unit has in addition one sound channel per ultrasonic converter, wherein each sound channel has an input opening with a first cross-sectional area and an output opening with a second cross-sectional area, and exactly one input opening is associated with each sound decoupling layer.

The output openings of all sound channels are arranged along a line and a distance from the center of one of the output openings to the center of an immediately adjacent output opening is at most the wavelength of the sound frequency or at most half the wavelength of the sound frequency, wherein the distance between immediately adjacent output openings is smaller than the distance between the corresponding input openings.

A quotient of a surface area of a cross-sectional area of the output opening to a surface area of the input opening has a value between or 0.30 and 1.2 or between 0.35 and 1.0 or between 0.4 and 0.8.

The ultrasonic converters of the 1D ultrasonic converter unit can be individual discrete components, wherein each ultrasonic converter due to insertion into the support structure, e.g., a housing, has a fixed position and thus also fixed distances from all further ultrasonic converters.

In this case, two ultrasonic converters, arranged next to one another and between which no further ultrasonic converter is arranged, are directly adjacent to one another.

The individual sound channels can be formed tubular or rod-shaped, wherein, for example, the tube diameter is reduced and/or the shape of the cross-sectional area changes and/or the course of the channel is curved or S-shaped.

The sound channels between the sound decoupling layer and the output opening advantageously have smooth inner walls and, in particular, no edges.

With the multiple, individually controllable ultrasonic converters, wave fronts with an adjustable main propagation direction can be generated by time-shifted or phase-shifted control.

By arranging sound channels in front of the individual ultrasonic converters, the individual sound sources are relocated to the respective ends or the output openings of the sound channels in the case of superposition or for superposition to form a common wave front.

This makes it possible to reduce the distances between the sound sources compared with the distances between the individual converters, in particular to adjust the distances between the individual sound sources independently of the size, e.g., the diameter, of the individual ultrasonic converters or independently of the distances between the individual converters.

An advantage of the invention is therefore that the radiating aperture of a piezoelectric transducer, e.g., a circular aperture with a diameter predetermined by the piezoelectric body, is changed by means of the sound channels so that they satisfy the conditions of a desired array arrangement in at least one dimension and the design can form a phased array device.

In particular, with a large output area of the respective sound channels, i.e., with a quotient of greater than 0.3, the sound pressure and thus the detection range of the arrangement can almost be maintained in comparison with the detection range of an individual ultrasonic converter. With smaller quotients or an area reduction in both dimensions, the range of the device is reduced in comparison with the detection range of a single ultrasonic converter.

In particular, in contrast to MEMS-based ultrasonic converters, significantly greater powers can be achieved and, as a result, objects or structures can also be reliably detected at distances of more than 0.5 m.

The course of the sound channel and the dimensioning of the output opening also make it possible to direct the wave front in one dimension and to spatially focus the expansion of the wave front in the other dimension orthogonal thereto.

Surprisingly, it has been shown that focusing in the orthogonal dimension is achieved with only a 1-dimensional sound converter and the associated sound channel.

A solution approach with multidimensional array arrangements would here require considerably more ultrasonic converters and additional complexity in the control unit. The reliability in the case of a multidimensional sound converter is much lower.

The same also applies conversely to the reception sensitivity of the array sensor system described. The reception sensitivity is maintained by maintaining the receiving area of at least 0.3 times the ultrasonic converter input area.

An advantage of the inventive solution is that the described sensor system can both transmit and receive in this frequency range under array conditions in a gaseous medium.

In particular, current MEMS structures can only be used as microphones in connection with gaseous media.

With a housing diameter of the individual ultrasonic converters of 7 mm, for example, the distance between two converters is at least 14 mm, however.

Without a sound channel, therefore only wave fronts with frequencies up to at most 22 kHz (lambda ≥14 mm) or up to at most 11 kHz (lambda ≥14 mm) can be realized.

The generation of wave fronts with higher frequencies, therefore, smaller wavelengths, is only possible with the same ultrasonic converters with the aid of the sound channels of the invention, because the distance between the individual "sound sources" during the superposition is not determined by the size of the converter housing, but only by the size and distance of the sound channel output openings.

The sound channels also ensure a precise, directional detection.

Another advantage is that in particular reliable, housed, discrete ultrasonic converters of a certain size can be used in a phase-controlled array for the detection of objects, spaced apart from the sensors, in gaseous media such as air.

The quotient between the surface area of the second cross-sectional area and the surface area of the first cross-sectional area can have a value between 0.35 and 1.0 or between 0.40 and 0.8.

The surface area of the input area in relation to the surface area of the output area of the sound channel can be enlarged or reduced or maintained, wherein in all embodiments a reduction of at least the width of the output opening compared with the width of the input opening is carried out.

A length from the sound decoupling layer of each ultrasonic converter to the output opening of the associated sound channel can be an integral multiple of an eighth of the wavelength of the sound frequency or an integral multiple of half the wavelength of the sound frequency.

The output openings of all sound channels can lie in a common flat plane or in a curved surface. By arranging them in a curved surface, e.g., a concave surface, focused wave fronts can be generated, for example.

Each sound channel can be formed solely of a metal or a plastic. Alternatively, each sound channel comprises a metal or a plastic.

Each ultrasonic converter can protrude with the sound decoupling layer in front into the associated input opening and in a further refinement, each sound channel precisely accommodates at least one part of the associated ultrasonic converter.

Stated differently, an inner shape of the sound channels in the area of the input opening corresponds as precisely as possible to an outer shape of the respective ultrasonic converter.

The housing of each ultrasonic converter can have a diameter of at least 7 mm.

The housing of each ultrasonic converter preferably comprises a cylindrical metal cup and, in a further refinement, has a sound uncoupling layer between the decoupling layer and the metal cup.

A surface of the sound decoupling layer, an edge of the metal cup, and the sound uncoupling layer, arranged therebetween, of each individual ultrasonic converter each can span a flat plane.

Each ultrasonic converter can have electromagnetic shielding that is at a reference potential. It is understood that the electromagnetic shielding can also be formed completely or at least partially by the housing, in particular a metal cup serving as a housing.

The 1D ultrasonic converter unit can also have a common shielding for all ultrasonic converters, e.g., a common housing.

The housing of each ultrasonic converter is designed at least according to the IP 40 protection class.

Each sound channel can have a wall thickness of at least 0.5 mm or at least 1 mm.

Two sound channels can each have a distance of at least 0.5 mm or at least 1 mm from one another over the entire length of the two sound channels.

The support structure can comprises a first flat plane on a first end face and a second flat plane on a second end face of the support structure, wherein the first end face is formed parallel to the second end face.

For this purpose, the ultrasonic sensors are arranged at the input openings along a first straight line and the output openings of the sound channels along a second straight line. The two straight lines are preferably formed parallel to one another. It is understood that the length of the second straight line is much smaller than the length of the first straight line. One advantage is that installation of the support structure with two parallel end faces in a receiving device is significantly simplified.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
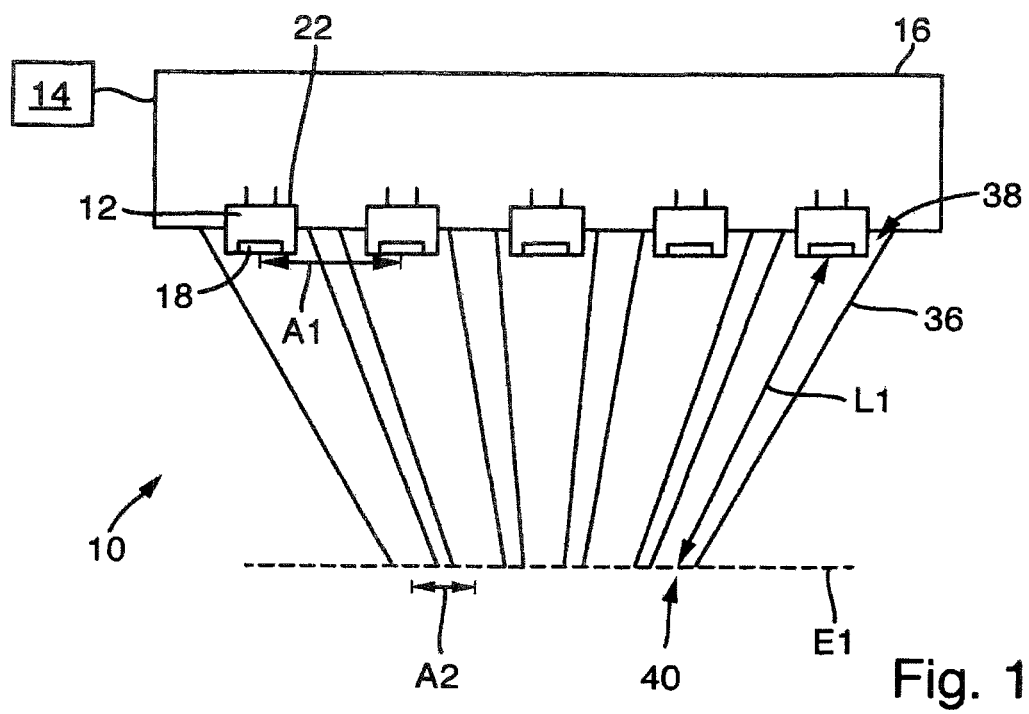
FIG. 1 shows a view of an embodiment of the invention of a 1 D ultrasonic converter unit.

The illustration in FIG. 1 shows a view of an embodiment of a 1D ultrasonic converter unit 10 of the invention, comprising five ultrasonic converters 12 arranged along a straight line for detecting objects, contours, or distances and a control unit 14, wherein control unit 14 is designed to control each ultrasonic converter 12 individually.

In the exemplary embodiment shown, ultrasonic converters 12 are embedded in a common carrier structure 16 at regular intervals A1, wherein each ultrasonic converter has a piezoelectric body 18 and a housing 22 enclosing piezoelectric body 18. Each ultrasonic converter 12 is designed to emit and/or to receive the same frequency, wherein the frequency is in a range from 20 kHz to 100 kHz.

Figures 2A, 2B:
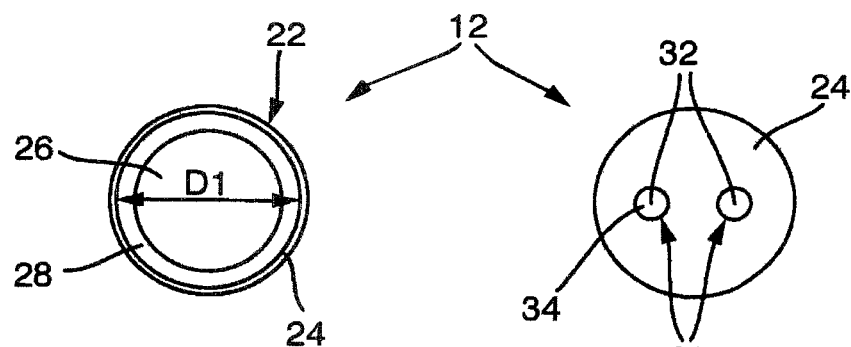
FIGS. 2 A, B show a view of an embodiment of the invention of a single ultrasonic converter.

A plan view of a first embodiment of the invention of one of the ultrasonic converters 12 is shown in the illustration of FIG. 2A. Housing 22 of each ultrasonic converter 12 has a cylindrical metal cup 24 with an outer diameter D1 of at least 7 mm. Housing 22 forms a shielding 20, which is at a reference potential, for piezoelectric body 18.

A sound decoupling layer 26 for decoupling sound waves in a gaseous medium is disposed at an open end of metal cup 24. A sound uncoupling layer 28 is disposed between decoupling layer 26 and metal cup 24.

A surface of sound decoupling layer 26, an edge of metal cup 24, and sound uncoupling layer 28, disposed therebetween, of each ultrasonic converter 12 are each located in a common flat plane.

The distance A1 between two adjacent ultrasonic converters 12 of 1D ultrasonic converter unit 10 indicates the distance from a center of sound decoupling layer 26 of one ultrasonic converter 12 to a center of sound decoupling layer 26 of the other ultrasonic converter 12. The distance A1 is at most 10 cm or at most 5 cm or at most 2 cm.

A rear view of housing 22 of one of ultrasonic converters 12 is shown in the illustration of FIG. 2B. A bottom of metal cup 24 has two through-holes 30 through which an electrical connection contact 32 is fed out of a housing interior. The electrical connection contacts 32 are electrically insulated from metal cup 24 by means of a potting compound 34.

1D ultrasonic converter unit 10 has one sound channel 36 per ultrasonic converter, wherein each sound channel has an input opening 38, an output opening 40, and a length L1 of at least 3 cm and at most 20 cm. The input openings are each arranged in front of or around one of the ultrasonic converters 12 such that the respective ultrasonic converter 12 emits into channel 36.

In the exemplary embodiment shown, for this purpose one ultrasonic converter 12 in each case extends at least partially into the respectively associated sound channel 36, so that sound decoupling layer 26 is located completely within the respective sound channel 36. In an embodiment that is not shown, it is also possible to position the input opening at a small distance in front of sound decoupling layer 26 or, for example, adjacent to the edge of the metal cup.

In each case, two adjacent output openings have a distance A2 from the center of the output opening to the center of the output opening of at most 5 cm or at most 2 cm or at most 0.5 cm. According to the invention, the distance A2 between output openings 40 is in each case less than or equal to the distance A1 between input openings 38.

A length L1 from each sound decoupling layer 26 to output opening 40 of the associated sound channel 36 is an integral multiple of an eighth of the wavelength of the sound frequency.

Figure 3:
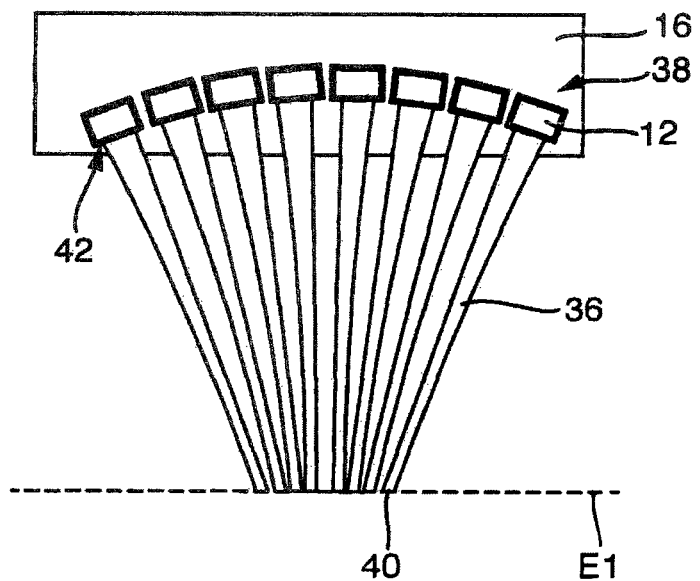
FIG. 3 shows a view of an embodiment of the invention of the sound channels.
Figure 4:
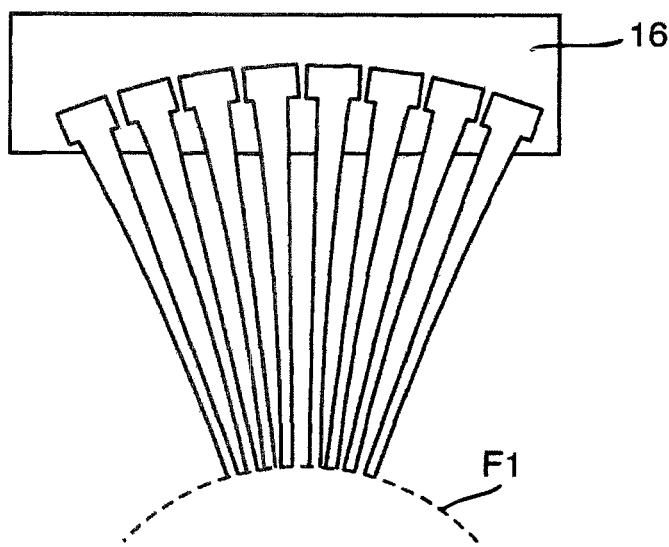
FIG. 4 shows a view of an embodiment of the invention of the sound channels.

In the illustrations of FIGS. 3 and 4, further embodiments of the invention of the sound channels are shown schematically. The differences in regard to the embodiment of FIG. 1 or of FIG. 3 will be explained hereafter.

In the exemplary embodiment shown in FIG. 3, sound channels 36 run such that output openings 40 of all sound channels 36 lie in a common plane E1.

A region of the respective sound channel 36, said region adjoining input opening 38 of each sound channel 36, is designed such that the respectively associated ultrasonic converter 12 fits precisely into sound channel 36. For this purpose, each sound channel 36 in the region has an inner diameter corresponding to outer diameter D1 and an edge 42 serving as a stop.

Input openings 38 with ultrasonic converter 12 are each arranged in support structure 16 such that output openings 40 lie in plane E1 and length L1 from each sound decoupling layer 26 to the associated output opening is a multiple of one eighth of the wavelength of the sound frequency.

In the exemplary embodiment shown in FIG. 4, output openings 40 of all sound channels 36 lie in a concavely curved surface F1.

Figure 5:
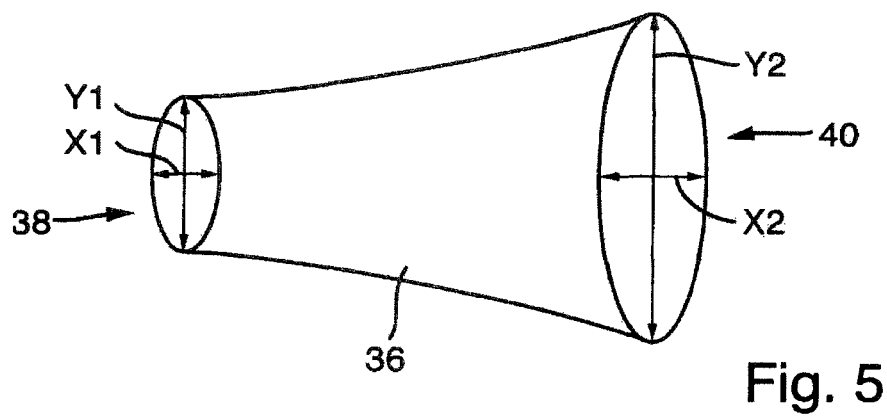
FIG. 5 shows a view of an embodiment of an individual sound channel.

An individual sound channel 36 is shown schematically in the illustration in FIG. 5, only the differences from FIGS. 1 to 4 being explained below.

Input opening 38 has a cross-sectional area with a width x1 and a height y1, and output opening 40 has a cross-sectional area with a width x2 and a height y2.

The input opening is formed circular, i.e., the width x1 and height y1 of the cross-sectional area have the same value. The output opening, in contrast, has an oval shape, so that the width x2 of the cross-sectional area is smaller than the width y2.

The width x2 of output opening 40 is preferably smaller than the width x1 of input opening 38. In contrast, the height y2 of output opening 40 is preferably greater than the height y1 of input opening 38.

The increase in height of sound channel 36 particularly preferably compensates for the decrease in the width of sound channel 36, such that the surface area of the cross-sectional area of input opening 38 corresponds to the surface area of the cross-sectional area of output opening 40.

It is understood that the width x2 of each output opening 40 must be smaller than the wavelength of the sound frequency in order to be able to realize a distance from the center of output openings 40 to the center of an immediately adjacent output opening 40 of at most the wavelength of the sound frequency.

Figure 6:
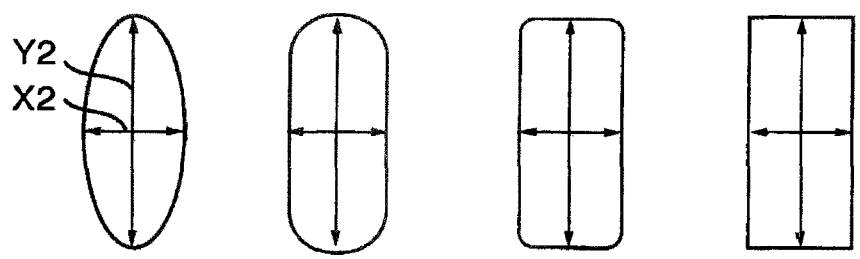
FIG. 6 shows a view of various embodiments of an output surface of a sound channel.

In the illustration in FIG. 6, a number of exemplary embodiments of the invention of the cross-sectional areas of output openings 40 are shown schematically. So that the surface area of the cross-sectional area of output opening 40 corresponds to the surface area of the cross-sectional area of input opening 38, shapes are particularly suitable that have a ratio of width x2 to height y2 of approximately 1.5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A 1D ultrasonic converter unit comprising:
    at least three ultrasonic converters to detect objects, contours, or distances, each of the at least three ultrasonic converters has a housing, a piezoelectric body disposed in the housing, and a sound decoupling layer arranged at an open end of the housing for decoupling sound waves in a gaseous medium; and
    a control unit configured to control each of the at least three ultrasonic converters individually,
    wherein the at least three ultrasonic converters are configured to emit and/or to receive the same frequency, the frequency being in a range from 20 kHz to 400 kHz,
    wherein, two ultrasonic converters of the at least three ultrasonic converters, directly adjacent to one another, have a distance from a center of the sound decoupling layer to a center of the sound decoupling layer of at most 10 cm or at most 5 cm or at most 2 cm,
    wherein the 1D ultrasonic converter unit has one sound channel per ultrasonic converter,
    wherein each sound channel has an input opening with a first cross-sectional area and an output opening with a second cross-sectional area,
    wherein exactly one of the input openings is associated with each sound decoupling layer,
    wherein the output openings are arranged along a line,
    wherein a distance from a center of one of the output openings to a center of an immediately adjacent output opening corresponds at most to a wavelength in a gaseous medium or at most to half the wavelength in the gaseous medium,
    wherein a distance between two directly adjacent output openings is in each case smaller than a distance between corresponding input openings,
    wherein a quotient of a surface area of the output opening to a surface area of the input opening has a value between 0.30 and 1.2,
    wherein each sound channel has at least a length of the diameter of the input opening,
    wherein the at least three ultrasonic converters are embedded in a common support structure, and
    wherein the output openings of all sound channels lie in a curved surface.

2. The 1D ultrasonic converter unit according to claim 1, wherein the quotient of the surface area of the output opening to the surface area of the input opening has a value between 0.35 and 1.0 or between 0.4 and 0.8.

3. The 1D ultrasonic converter unit according to claim 1, wherein a length from the sound decoupling layer of each ultrasonic converter to the output opening of the associated sound channel is an integral multiple of a quarter of the wavelength in the gaseous medium or an integral multiple of half the wavelength in the gaseous medium.

4. The 1D ultrasonic converter unit according to claim 1, wherein each sound channel consists of a metal or a plastic or comprises a metal or a plastic.

5. The 1D ultrasonic converter unit according to claim 1, wherein each ultrasonic converter protrudes with the sound decoupling layer in front into the associated input opening.

6. The 1D ultrasonic converter unit according to claim 5, wherein each sound channel precisely accommodates at least one part of the associated ultrasonic converter.

7. The 1D ultrasonic converter unit according to claim 1, wherein the housing of each ultrasonic converter has a diameter of at least 5 mm.

8. The 1D ultrasonic converter unit according to claim 1, wherein a number of elements increases and 4 or 5 or 6 or 8 or 16 ultrasonic converters are located on one line.

9. The 1D ultrasonic converter unit according to claim 1, wherein the respective sound channels have a same length.

10. The 1D ultrasonic converter unit according to claim 1, wherein the ultrasonic converters lie in a common flat plane and the respective sound channels have unequal lengths.

11. The 1D ultrasonic converter unit according to claim 1, wherein the housing of each ultrasonic converter comprises a cylindrical metal cup.

12. The 1D ultrasonic converter unit according to claim 11, wherein the housing of each ultrasonic converter has a sound uncoupling layer between the decoupling layer and the metal cup.

13. The 1D ultrasonic converter unit according to claim 12, wherein a surface of the sound decoupling layer, an edge of the metal cup, and the sound uncoupling layer disposed therebetween, of each of the at least three ultrasonic converters, each span a flat plane.

14. The 1D ultrasonic converter unit according to claim 1, wherein each ultrasonic converter has electromagnetic shielding that is at a reference potential.

15. The 1D ultrasonic converter unit according to claim 1, wherein the housing of each of the at least three ultrasonic converter is designed at least according to the IP 40 protection class.

* * * * *